United States Patent
Takahashi (10) Patent No.: US 6,209,001 B1
(45) Date of Patent: Mar. 27, 2001

(54) BACK-UP SYSTEM CAPABLE OF PERFORMING BACK-UP OPERATION AT OPTIONAL TIME

(75) Inventor: Shinichi Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/123,866

(22) Filed: Jul. 28, 1998

(30) Foreign Application Priority Data

Jul. 31, 1997 (JP) .................................................. 9-220655

(51) Int. Cl.⁷ .................................................. G06F 17/30
(52) U.S. Cl. .................................................. 707/204
(58) Field of Search ........................ 700/1–10, 100–104, 700/200–206; 711/113, 138, 161, 162; 714/6, 48, 49, 54

(56) References Cited

U.S. PATENT DOCUMENTS

| | | | |
|---|---|---|---|
| 5,694,570 | * 12/1997 | Beardsley et al. | 711/113 |
| 5,778,394 | * 7/1998 | Galtzur et al. | 707/205 |
| 5,815,656 | * 9/1998 | Candelaria et al. | 714/54 |
| 5,909,700 | * 6/1999 | Bitner et al. | 711/162 |

FOREIGN PATENT DOCUMENTS

| | | |
|---|---|---|
| 2133845 | 5/1990 | (JP) . |
| 2270018 | 11/1990 | (JP) . |
| 4311219 | 11/1992 | (JP) . |
| 6348420 | 12/1994 | (JP) . |
| 7152494 | 6/1995 | (JP) . |

OTHER PUBLICATIONS

Office Action Issued by the Japanese Patent Office on Nov. 17, 1998 and a Translation Thereof.

* cited by examiner

Primary Examiner—Ruay Lian Ho
(74) Attorney, Agent, or Firm—Ostrolenk, Faber, Gerb & Soffen, LLP (57) ABSTRACT

In a back-up system, during normal operation, a first data is stored in a main storage unit and a buffer storage unit and also transferred to an auxiliary storage unit. During a back-up operation, the auxiliary storage unit is no longer updated and the first data stored in the auxiliary storage unit is transferred to a back-up storage unit. Also during the back-up operation, a second data is stored in the main storage unit and the buffer storage unit. Then, after the back-up operation has been performed, the second data is transferred from the buffer storage unit to the auxiliary storage unit.

9 Claims, 6 Drawing Sheets

BACK-UP SYSTEM CAPABLE OF PERFORMING BACK-UP OPERATION AT OPTIONAL TIME

BACKGROUND OF THE INVENTION

1. Field of the Invention

The present invention relates to a data back-up operation of an information processing apparatus, and more particularly to a data backup operation into a storage unit in an information processing apparatus.

2. Description of the Related Art

A conventional example of a data back-up system of an information processor is described in Japanese Laid Open Patent Application (JP-A-Heisei 4-311219). In the conventional example, 2 input/output (I/O) interfaces are provided for each of large capacity storage units to back up data stored in the large capacity storage unit into a back-up unit. As is known in the art, a large capacity storage unit typically refers to mass storage devices such as an array of disks or other large capacity storage devices that generally have slower access times than main memory devices and are used for storing information that is not constantly being addressed. By using one of the I/O interfaces, a normal data transfer is performed between a main memory and the large capacity storage unit, and by using the other, the data back-up is performed from the large capacity storage unit into the back-up unit.

Figure 1:
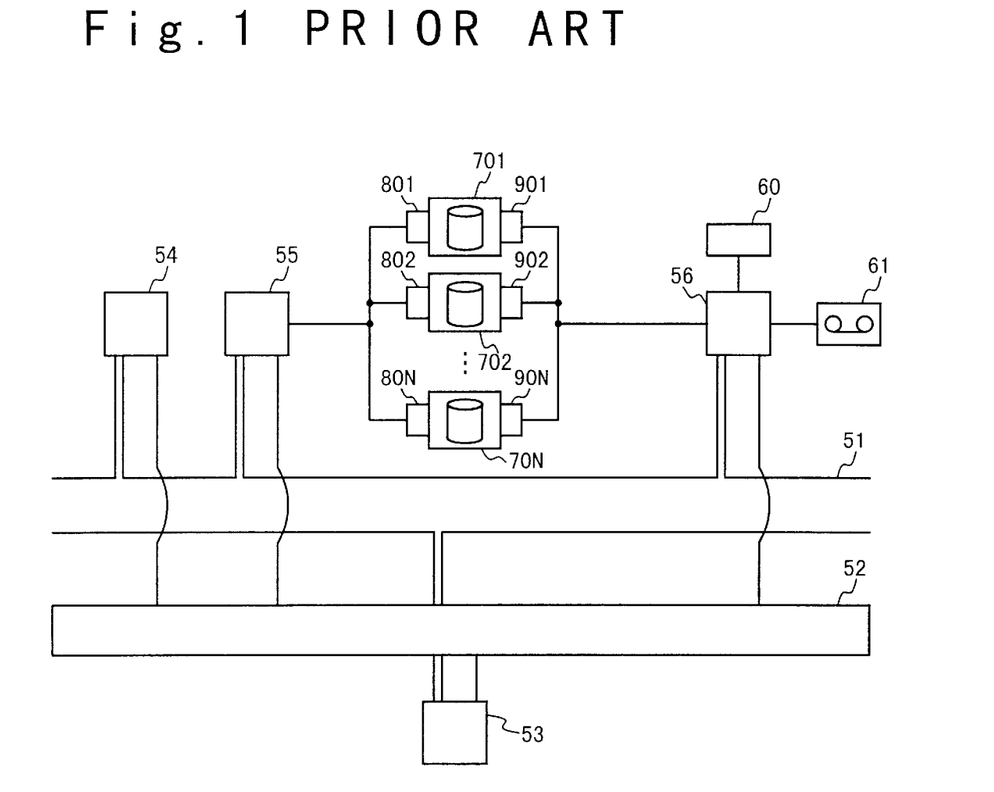
FIG. 1 is a block diagram illustrating the structure of a conventional back-up system of an information processing apparatus.

FIG. 1 is a block diagram illustrating the structure of the data back-up system which is proposed in the above Japanese Laid Open Patent Application (JP-A-Heisei 4-311219). Referring to FIG. 1, the data back-up system is composed of a data bus 51, a control bus 52, a central processing unit (CPU) 53, a main memory 54, a main disk control mechanism 55, a back-up disk control mechanism 56, N magnetic disk units 70X (701 to 70N) each having two I/O interfaces, a back-up RAM 60 as a back-up file memory, and a back-up unit 61. In FIG. 1, 80X (X=1, 2, ..., N) is a main I/O interface and 90X (X=1, 2, ..., N) is a back-up I/O interface.

However, the conventional back-up system has the following problems.

That is, the first problem is in that if the content of the storage unit 70X is updated while the back-up operation is performed, there is possibility that it becomes not possible to take the coincidence between the updated content of the storage unit 70X and the backed-up content. In such a case, the back-up operation needs to be immediately stopped such that the back-up operation needs to be re-started. This is because the single storage unit 70X can be accessed through the two I/O interfaces in the above conventional back-up apparatus. Accordingly, when one storage unit is accessed so that a plurality of portions of the content of the storage unit is updated, there is possibility that a part of the content of the storage unit is updated well sum of the content is not updated.

The second problem is in that a complicated mechanism is needed for the back-up operation. This is because each of the plurality of storage units needs to have the two I/O interfaces.

SUMMARY OF THE INVENTION

The present invention is accomplished in view of the above problems. Therefore, an object of the present invention is to provide a back-up system which can perform a back-up operation of the storage content of a storage unit at an optional time.

Another object of the present invention is to provide a back-up system in which the operation of the whole system is not limited because of a back-up operation.

Still another object of the present invention is to provide a back-up system in which the storage content of a storage unit always coincides with a backed-up content.

Yet still another object of the present invention is to provide a back-up system which has a simple structure with high reliability and operability.

In order to achieve an aspect of the present invention, a back-up system includes a main storage unit, a buffer storage unit, an auxiliary storage unit, and a back-up storage unit. A control unit controls the main storage unit and the auxiliary storage unit in a normal operation such that a first data is written in the main storage unit and the auxiliary storage unit. Also, the control unit controls the auxiliary storage unit and the back-up storage unit in a back-up operation such that the first data stored in the auxiliary storage unit is transferred to the back-up storage unit, and controls the main storage unit, the buffer storage unit and the auxiliary storage unit during the back-up operation such that a second data is stored in the main storage unit and the buffer storage unit but is not stored in the auxiliary storage unit. Also, the control unit controls the buffer storage unit and the auxiliary storage unit after the back-up operation such that the second data is transferred from the buffer storage to the auxiliary storage unit.

In order to achieve another aspect of the present invention, a back-up system includes a main storage unit, an auxiliary storage unit for storing a same data as that stored in the main storage unit, and a back-up storage unit. A control unit sets a back-up mode in response to a back-up start instruction, and controls the auxiliary storage unit in the back-up mode such that the auxiliary storage unit does not store any data. Also, the control unit controls the auxiliary storage unit and the back-up storage unit in the back-up mode during the back-up mode such that a first data stored in the auxiliary storage unit is transferred to the back-up storage unit, and resets the back-up mode. In addition, the back-up system may further include a buffer storage unit. In this case, the control unit controls the buffer storage unit to store a second data during the back-up mode when the second data is stored in the main storage unit, and controls the buffer storage unit and the auxiliary storage unit such that the second data is transferred from the buffer storage to the auxiliary storage unit when the back-up mode is reset.

In order to achieve still another aspect of the present invention, a back-up system includes a main storage unit, an auxiliary storage unit, and a back-up storage unit. A control unit controls the main storage unit and the auxiliary storage unit to store a first data in a normal operation, and controls the auxiliary storage unit and the back-up storage unit in a back-up operation such that the first data is transferred from the auxiliary storage unit to the back-up storage unit.

When the back-up system further includes a selector, the control unit controls the selector such that the first data is supplied to the auxiliary storage unit in the normal operation. When the back-up system further includes a buffer storage unit, the control unit controls the selector during the back-up operation such that a second data is supplied to the buffer storage unit when the second data is stored in the main storage unit. Also, the control unit controls the buffer storage unit and the auxiliary storage unit after the back-up operation such that the second data is transferred from the buffer storage unit to the auxiliary storage unit.

In order to achieve yet still another aspect of the present invention, a method of backing up a first data stored in a main memory into a back-up storage unit in an information processing system, includes the steps of:

storing a first data in an auxiliary storage unit during a normal operation when the first data is stored in a main storage unit, inhibiting update of a storage content of the auxiliary storage unit in a back-up operation, transferring the first data from the auxiliary storage unit to the back-up storage unit during the back-up operation, and storing a second data in a buffer storage unit during the back-up operation when the second data is stored in the main storage unit, and transferring the second data from the buffer storage unit to the auxiliary storage unit after the back-up operation.

In addition, in order to achieve an aspect of the present invention, a method of backing up a first data stored in a main memory into a back-up storage unit in an information processing system, includes the steps of:

storing a first data in a main storage unit and an auxiliary storage unit in a normal operation, and transferring the first data from the auxiliary storage unit to a back-up storage unit in a back-up operation.

DESCRIPTION OF THE PREFERRED EMBODIMENTS

A back-up system of an information processing apparatus of the present invention will be described below in detail with reference to the attached drawings.

Figure 2:
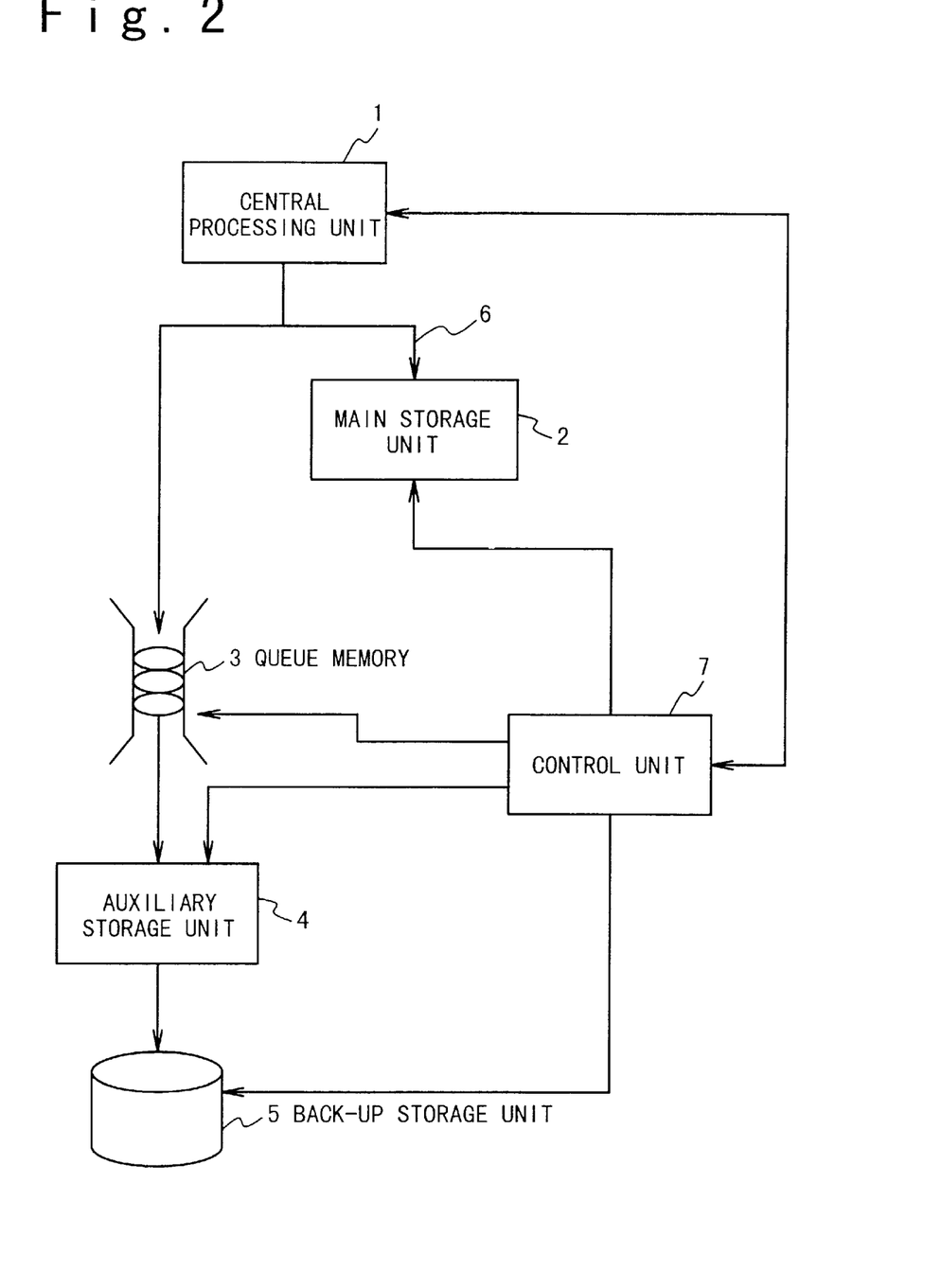
FIG. 2 is a block diagram illustrating the structure of a back-up system of an information processing apparatus according to a first embodiment of the present invention.

FIG. 2 is a block diagram illustrating the structure of the back-up system according to the first embodiment of the present invention. Referring to FIG. 2, the back-up system in the first embodiment is compose of a central processing unit 1, a main storage unit 2, a queue memory 3, an auxiliary storage unit 4, a back-up storage unit 5 and a control unit 7.

In order to keep the coincidence of the storage content between the main storage unit 2 and the auxiliary storage unit 4, a data is written from the central processing unit 1 to the main storage unit 2 and to the auxiliary storage unit 4 through the queue memory 3.

The back-up operation is performed in such a manner that the storage content of the auxiliary storage unit 4 is transferred to the back-up storage unit 5. The main storage unit 2 does not participate to the back-up operation from the auxiliary storage unit 4 to the back-up storage unit 5. Also, the central processing unit 1 can access the main storage unit 2 regardless of the back-up operation. The queue memory 3 as a buffer memory accumulates the updated content of the main storage unit 2 during the back-up operation. Then, after back-up operation, the storage content of the auxiliary storage unit 4 is updated based on the storage content of the queue memory 3.

The control unit 7 receives a back-up request from the central processing unit 1 or a user to start the back-up operation. Alternatively, the control unit 7 may start the back-up operation autonomously for every predetermined time period or in accordance with the condition of the information processing apparatus. Also, the control unit 7 informs the state of the back-up operation or the situation of the information processing apparatus to the central processing unit 1 or the user.

Thus, in the back-up system according to the first embodiment of the present invention, the auxiliary storage unit 4 which has the same storage content as that of the a main storage unit 2 is provided, and the storage content of the auxiliary storage unit 4 is first fixed at the time of a back-up operation such that discrepancy between the storage content of the auxiliary storage unit 4 and the backed-up content of a back-up storage unit 5.

In this way, in the back-up system of the present invention, two storage units of the main storage unit 2 and the auxiliary storage unit 4 are provided. Because the main storage unit 2 does not have any direct relation with the back-up storage unit 5, it is possible to update the storage content of the main storage unit 2 during the back-up operation. Also, the storage content of the auxiliary storage unit 4 is first fixed in case of the back-up operation, and then data transfer is performed from the auxiliary storage unit 4 to the back-up storage unit 5. Then, the update content of the main storage unit 2 is stored in the queue memory 4, and the storage content of the auxiliary storage unit 4 is updated based on the storage content of the queue memory 3 after the back-up operation.

In this case, the control unit 7 controls the main storage unit 2, the queue memory 3, the auxiliary storage unit 4 and the back-up storage unit 5 in response to a back-up request from a central processing unit 1 or a user. Or, the back-up operation is started autonomously. Also, the control unit 7 informs the situation of the back-up operation or the state of the storage units to the central processing unit 1 or the user.

Next, the operation of the back-up system according to the first embodiment of the present invention will be described below.

Figure 3:
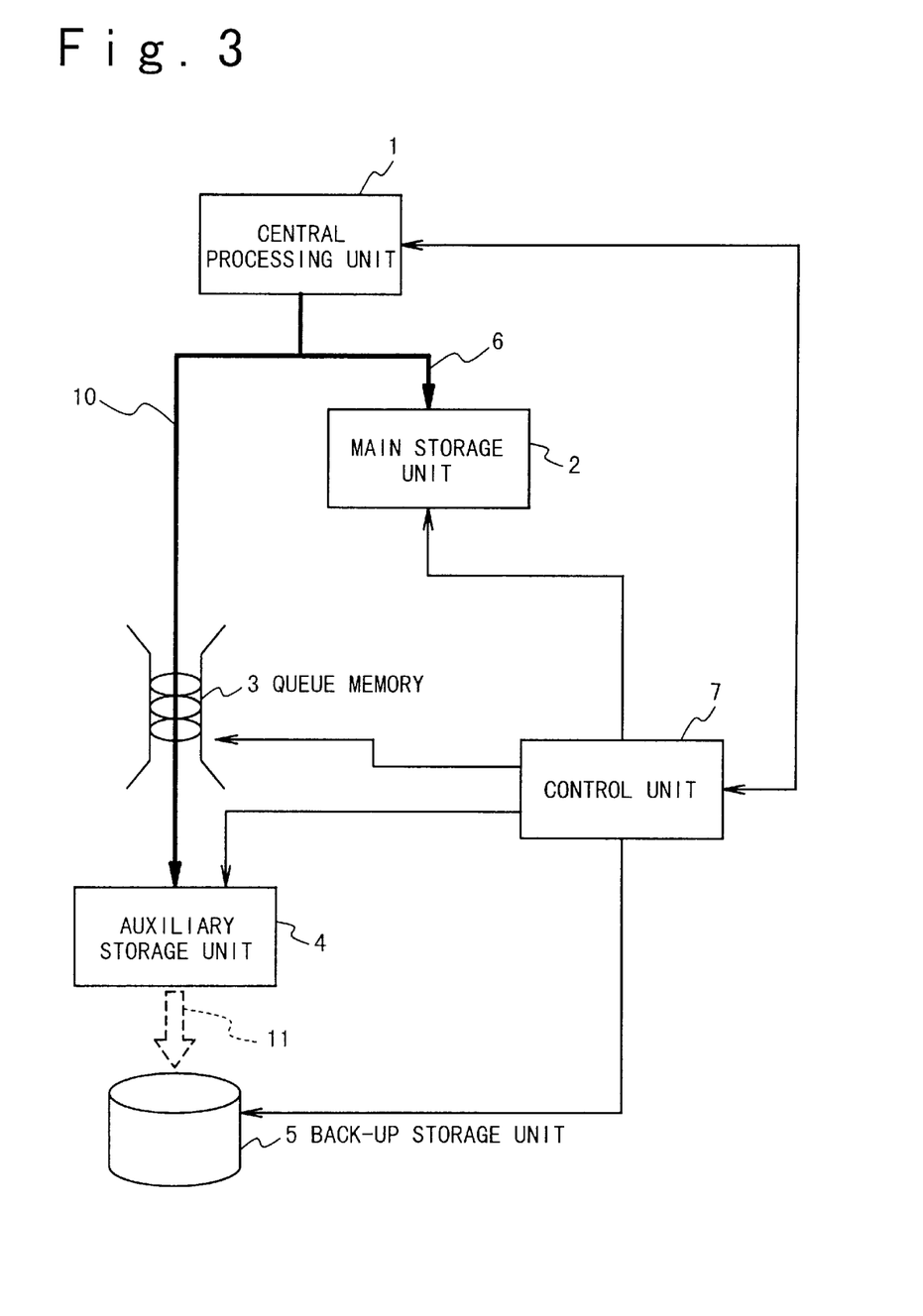
FIG. 3 is a diagram to explain the operation of the information processing apparatus according to the first embodiment of the present invention when a back-up operation is not performed.

FIG. 3 is a diagram to explain the operation of the back-up system when the back-up operation is not performed in the first embodiment. Referring to FIG. 3, the control unit 7 controls the main storage unit 2, the queue memory 3 and the auxiliary storage unit 4. As a result, a write data is transferred from the central processing unit 1 to the main storage unit 2 as shown as a signal 6, and at the same time to the auxiliary storage unit 4 through the queue memory 3, as shown as a signal 10. Thus, the coincidence of the storage contents can be kept between the main storage unit 2 and the auxiliary storage unit 4.

Figure 4:
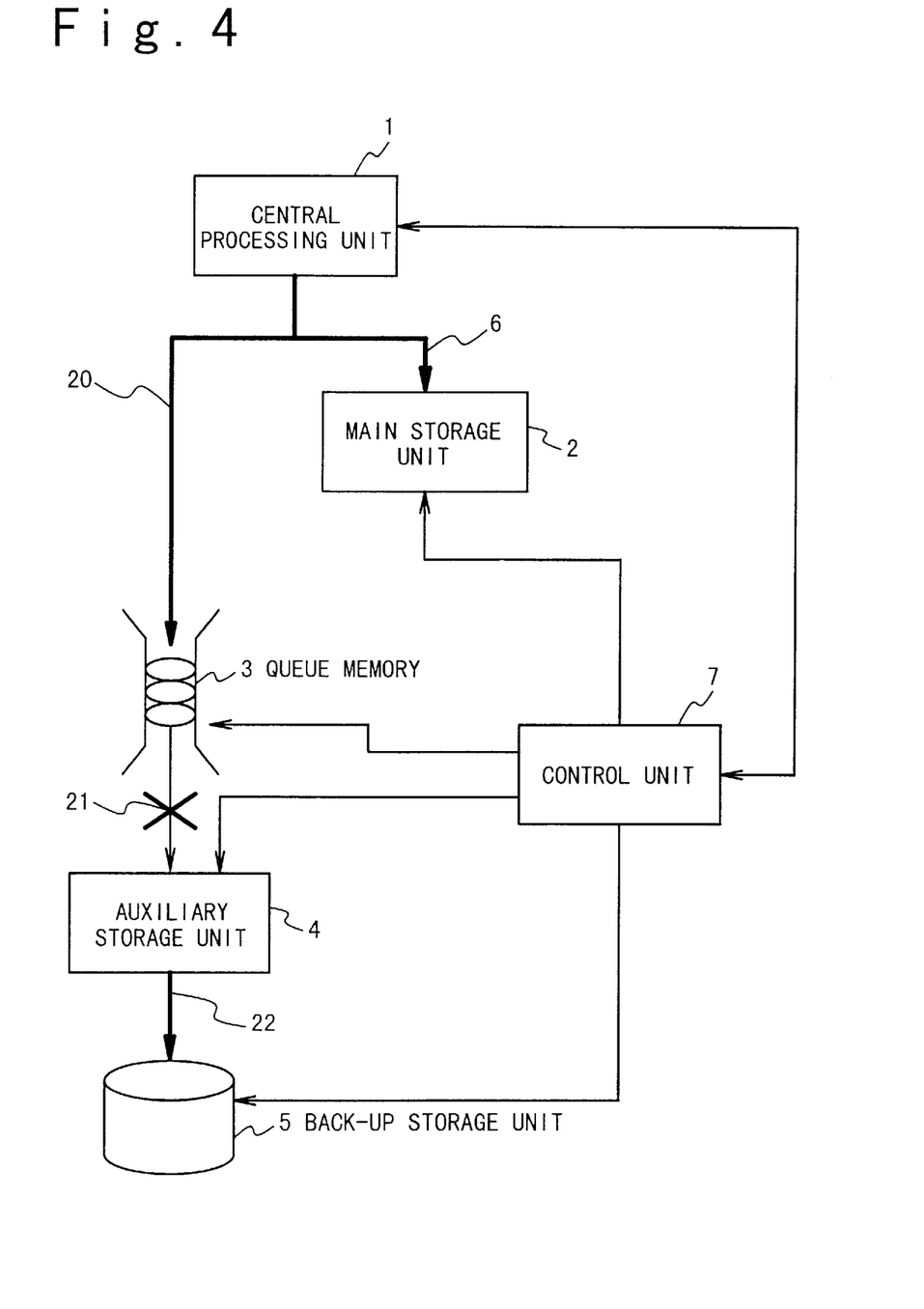
FIG. 4 is a diagram to explain the operation of the information processing apparatus according to the first embodiment of the present invention when the back-up operation is performed.

FIG. 4 is a diagram to explain the operation of the back-up system when the back-up operation is performed in the first embodiment. Referring to FIG. 4, the control unit 7 controls the main storage unit 2, the queue memory 3, the auxiliary storage unit 4 and the back-up storage unit 5. As a result, a write data is transferred from the central processing unit 1 to the main storage unit 2, as shown as the signal 6. At the same time, the write data is stored in the queue memory 3, as shown as a signal 20. In this case, the write data is not transferred to the auxiliary storage unit 4, as shown as a signal 21. Thus, the storage content of the auxiliary storage unit 4 is fixed. Then, the storage content of the auxiliary storage unit 4 is transferred to the back-up storage unit 5 during the back-up operation, as shown as a signal 22.

Figure 5:
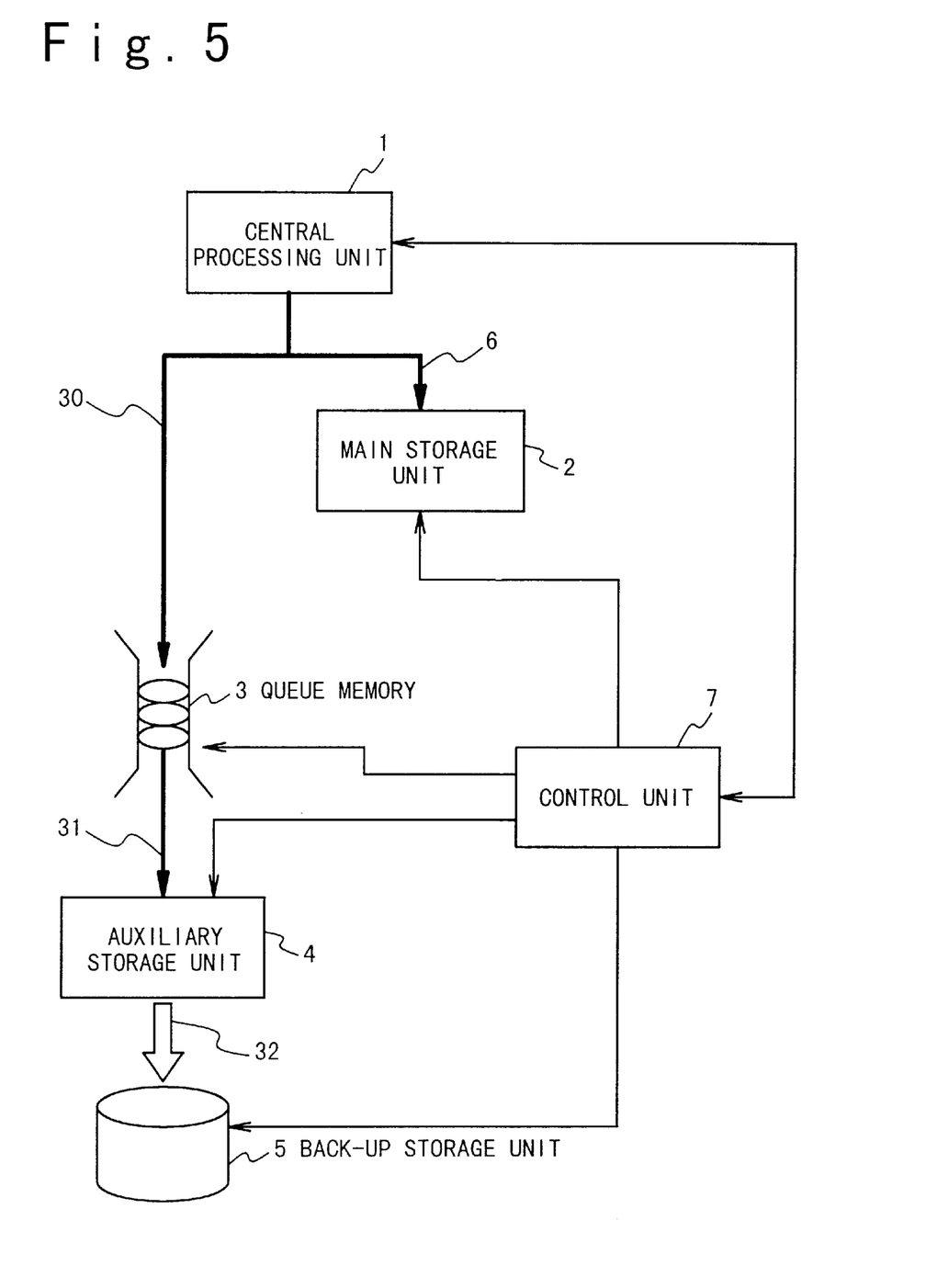
FIG. 5 is a diagram to explain the operation of the information processing apparatus according to the first embodiment of the present invention when the back-up operation is completed.

FIG. 5 is a block diagram to explain the operation of the back-up system after the back-up operation is completed in this embodiment. Referring to FIG. 5, the control unit 7 controls the main storage unit 2, the queue memory 3, the auxiliary storage unit 4 and the back-up storage unit 5. As a result, a write data is transferred from the central processing unit 1 to the main storage unit 2, as shown as a signal 6 and stored in the main storage unit 2. The write data is also transferred to the auxiliary storage unit 4 together with the write data which has already stored in the queue memory 3, as shown as a signal 31. Then, the storage content of the auxiliary storage unit 4 is written in the back-up storage unit 5 for updating of the storage content of the back-up storage unit 5.

Next, the back-up system according to the second embodiment of the present invention will be described with reference to FIG. 6.

Figure 6:
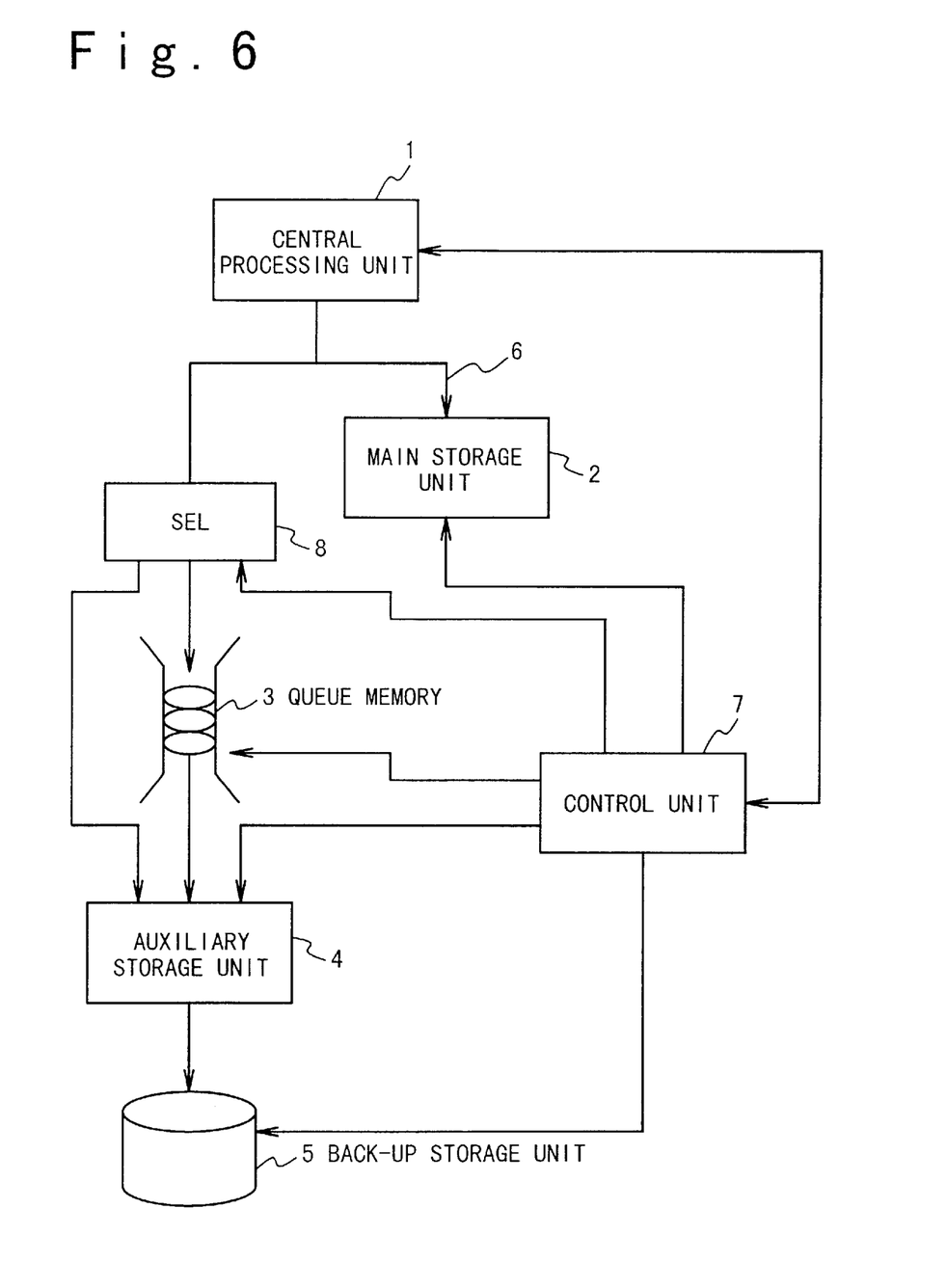
FIG. 6 is a block diagram illustrating the structure of the back-up system of the information processing apparatus according to a second embodiment of the present invention.

FIG. 6 is a block diagram illustrating the structure of the back-up system according to the second embodiment of the present invention. Referring to FIG. 6, the back-up system in the first embodiment is compose of a central processing unit 1, a main storage unit 2, a queue memory 3, an auxiliary storage unit 4, a back-up storage unit 5, a control unit 7 and a selector 8. In this manner, in the second embodiment, the selector 8 is added to the structure of the back-up system in the first embodiment.

The control unit 7 controls the selector 8 to pass the write data to the auxiliary storage unit 4 in a normal operation mode when the write data is stored in the main storage unit 2. Also, the control unit 7 controls the selector 8 to pass the write data to the queue memory 3 during a back-up operation mode in which the data stored in the auxiliary storage unit 4 is transferred to the back-up storage unit when the write data is stored in the main storage unit 2.

Next, the operation of the back-up system according to the first embodiment of the present invention will be described below.

When the back-up operation is not performed in the first embodiment, the control unit 7 controls the main storage unit 2, the queue memory 3, the selector 8 and the auxiliary storage unit 4. As a result, a write data is transferred from the central processing unit 1 to the main storage unit 2 as shown as a signal 6, and directly to the auxiliary storage unit 4 through the selector 8 at the same time. Thus, the coincidence of the storage contents can be kept between the main storage unit 2 and the auxiliary storage unit 4.

When the back-up operation is performed in the first embodiment in the back-up operation mode, the control unit 7 controls the main storage unit 2, the queue memory 3, the auxiliary storage unit 4, the selector 8 and the back-up storage unit 5. As a result, a write data is transferred from the central processing unit 1 to the main storage unit 2, as shown as the signal 6. At the same time, the write data is stored in the queue memory 3 through the selector 8. In this case, the write data is not transferred to the auxiliary storage unit 4. Thus, the storage content of the auxiliary storage unit 4 is fixed. Then, the storage content of the auxiliary storage unit 4 is transferred to the back-up storage unit 5 during the back-up operation, as shown as a signal 22.

After the back-up operation is completed in this embodiment, the control unit 7 controls the main storage unit 2, the queue memory 3, the auxiliary storage unit 4 and the back-up storage unit 5, as in the normal operation mode. As a result, a write data is transferred from the central processing unit 1 to the main storage unit 2, as shown as a signal 6 and stored in the main storage unit 2. The write data is also transferred to the auxiliary storage unit 4 together with the write data which has already stored in the queue memory 3, as shown as a signal 31. Then, the storage content of the auxiliary storage unit 4 is written in the back-up storage unit 5 for updating of the storage content of the back-up storage unit 5.

As described above, according to the present invention, the back-up operation can be performed at an optional time. Thus, the constrain of the operation of the whole system can be decreased and the reliability and the operability can be improved. This is because the auxiliary storage unit is provided in addition to the main storage unit, and the back-up operation to the back-up storage unit is performed based on the storage content of the auxiliary storage unit.

Also, according to the present invention, the structure of the back-up system can be simplified. This is because any circuit having a special structure is not needed in the present invention.

What is claimed is:

1. A back-up system comprising:

a main storage unit;

a buffer storage unit;

an auxiliary storage unit;

a back-up storage unit;

a control unit for controlling said main storage unit and said auxiliary storage unit in a normal operation such that a first data is written in said main storage unit and said auxiliary storage unit, for controlling said auxiliary storage unit and said back-up storage unit in a back-up operation such that said first data stored in said auxiliary storage unit is transferred to said back-up storage unit, and controlling said main storage unit, said buffer storage unit and said auxiliary storage unit during said back-up operation such that a second data is stored in said main storage unit and said buffer storage unit but is not stored in said auxiliary storage unit, and for controlling said buffer storage unit and said auxiliary storage unit after said back-up operation such that said second data is transferred from said buffer storage to said auxiliary storage unit.

2. A back-up system comprising:

a main storage unit;

an auxiliary storage unit for storing a same data as that stored in said main storage unit;

a back-up storage unit;

a buffer storage unit;

a control unit for setting a back-up mode in response to a back-up start instruction, for controlling said auxiliary storage unit in said back-up mode such that said auxiliary storage unit does not store any data, for controlling said auxiliary storage unit and said back-up storage unit in said back-up mode during said back-up mode such that a first data stored in said auxiliary storage unit is transferred to said back-up storage unit, and for resetting said back-up mode; and said control unit also for controlling said buffer storage unit to store a second data during said back-up mode when said second data is stored in said main storage unit, and controls said buffer storage unit and said auxiliary storage unit such that said second data is transferred from said buffer storage to said auxiliary storage unit when said back-up mode is reset.

3. A back-up system comprising:

a main storage unit;

an auxiliary storage unit;

a back-up storage unit;

a buffer storage unit;

a selector;

a control unit for controlling said main storage unit and said auxiliary storage unit to store a first data in a normal operation, and for controlling said auxiliary storage unit and said back-up storage unit in a back-up operation such that said first data is transferred from said auxiliary storage unit to said back-up storage unit;

said control unit also for controlling said selector such that said first data is supplied to said auxiliary storage unit in said normal operation; and said control unit further controlling said selector during said back-up operation such that a second data is supplied to said buffer storage unit when said second data is stored in said main storage unit.

4. A back-up system according to claim 3, wherein said control unit controls said buffer storage unit and said auxiliary storage unit after said back-up operation such that said second data is transferred from said buffer storage unit to said auxiliary storage unit.

5. A method of backing up a first data stored in a main memory into a back-up storage unit in an information processing system, comprising the steps of:

storing a first data in an auxiliary storage unit during a normal operation when said first data is stored in a main storage unit;

inhibiting update of a storage content of said auxiliary storage unit in a back-up operation;

transferring said first data from said auxiliary storage unit to said back-up storage unit during said back-up operation; and storing a second data in a buffer storage unit during said back-up operation when said second data is stored in said main storage unit; and transferring said second data from said buffer storage unit to said auxiliary storage unit after said back-up operation has been performed.

6. A method of backing up a first data stored in a main memory into a back-up storage unit in an information processing system, comprising the steps of:

storing a first data in a main storage unit and an auxiliary storage unit in a normal operation;

transferring said first data from said auxiliary storage unit to a backup storage unit in a back-up operation;

transferring said first data to said auxiliary storage unit through a selector in said normal operation;

transferring a second data to a buffer storage unit through said selector during said back-up operation when said second data is stored in said main storage unit; and transferring said second data from said buffer storage unit to said auxiliary storage unit after said back-up operation.

7. A back-up system comprising:

a main storage unit;

a buffer storage unit;

an auxiliary storage unit;

a back-up storage unit;

a control unit being operable to store a first data in said main storage unit and said auxiliary storage unit during a first operation;

said control unit being also operable to transfer said first data from said auxiliary storage unit to said back-up storage unit during said second operation; and said control unit being further operable to store at least a second data in said main storage unit and said buffer storage unit at the beginning of said second operation and continuing to store at least said second data in said main storage unit and said buffer storage unit during said second operation.

8. A back-up system according to claim 7, wherein said control unit being further operable to transfer said at least said second data from buffer storage unit to said auxiliary storage unit at the end of said second operation.

9. A back-up system according to claim 8, wherein said second operation is a back-up operation.

* * * * *